(12) United States Patent
Sugimoto et al.

(10) Patent No.: US 11,477,718 B1
(45) Date of Patent: Oct. 18, 2022

(54) SYSTEMS AND METHODS FOR SELECTING A ROUTING PROTOCOL

(71) Applicant: Toyota Motor North America, Inc., Plano, TX (US)

(72) Inventors: Shingo Sugimoto, Frisco, TX (US); Osamu Kawakami, Plano, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 13 days.

(21) Appl. No.: 17/219,014

(22) Filed: Mar. 31, 2021

(51) Int. Cl.
*H04W 40/24* (2009.01)
*H04W 40/02* (2009.01)
*H04W 80/04* (2009.01)
*H04L 45/00* (2022.01)
*H04W 4/46* (2018.01)
*H04W 84/18* (2009.01)

(52) U.S. Cl.
CPC ........... *H04W 40/026* (2013.01); *H04L 45/26* (2013.01); *H04W 40/246* (2013.01); *H04W 80/04* (2013.01); *H04W 4/46* (2018.02); *H04W 84/18* (2013.01)

(58) Field of Classification Search
CPC . H04W 40/026; H04W 40/246; H04W 80/04; H04W 4/46; H04W 84/18; H04L 45/26
See application file for complete search history.

(56) References Cited

U.S. PATENT DOCUMENTS

| | | | |
|---|---|---|---|
| 6,708,107 B2 | 3/2004 | Impson et al. | |
| 6,731,202 B1 | 5/2004 | Klaus | |
| 8,660,206 B2 | 2/2014 | Kohno | |
| 9,381,916 B1 | 7/2016 | Zhu et al. | |
| 9,421,909 B2 | 8/2016 | Strickland et al. | |
| 2009/0274093 A1* | 11/2009 | Senouci | H04W 40/38 370/328 |
| 2018/0143312 A1 | 5/2018 | High et al. | |
| 2022/0022284 A1* | 1/2022 | Foster | H04W 4/80 |

FOREIGN PATENT DOCUMENTS

| | | |
|---|---|---|
| CN | 103095593 B | 3/2016 |
| CN | 103281742 B | 3/2016 |
| CN | 103379575 B | 5/2016 |
| CN | 106209777 A | 12/2016 |
| CN | 106792977 A | 5/2017 |
| CN | 107155170 A | 9/2017 |

(Continued)

OTHER PUBLICATIONS

Tripp-Barba, et al. 'Survey on routing protocols for vehicular ad hoc networks based on multimetrics'. Electronics 2019, 8, 1177. Oct. 17, 2019.

*Primary Examiner* — Hashim S Bhatti (74) *Attorney, Agent, or Firm* — Dinsmore & Shohl LLP (57) ABSTRACT

A mesh network system includes an electronic control unit The electronic control unit is configured to determine a first motion state of a first vehicle of a plurality of vehicles of a mesh network. The electronic control unit is further configured to determine a second motion state of a second vehicle of the plurality of vehicles. The electronic control unit is further configured to select a dynamic routing protocol or a static routing protocol as a desired routing protocol based on the first motion state and the second motion state.

20 Claims, 7 Drawing Sheets

(56) References Cited

FOREIGN PATENT DOCUMENTS

| | | |
|---|---|---|
| CN | 105554838 B | 9/2018 |
| CN | 105554839 B | 4/2019 |
| CN | 110304584 A | 10/2019 |
| CN | 109640370 B | 5/2020 |
| CN | 111237009 A | 6/2020 |
| WO | 2018090181 A1 | 5/2018 |
| WO | 2019040902 A1 | 2/2019 |
| WO | 2020132141 A1 | 6/2020 |

* cited by examiner

SYSTEMS AND METHODS FOR SELECTING A ROUTING PROTOCOL

TECHNICAL FIELD

The present specification generally relates to mesh networks between vehicles and, more specifically, the present disclosure provides systems and methods for selection of a network routing protocol for communications between nodes of a mesh network based on a motion state of a vehicle.

BACKGROUND

Communication functionality between vehicles, the internet, and other data sources is an ever-increasing requirement for vehicles. Communication functionality enables a vehicle to share information, such as sensor information, receive and transmit system updates, navigation information, and the like. For example, when a vehicle requires an update, a vehicle connects to the internet and receives the update from an internet based data source, such as a server. Additionally, vehicles may be configured to establish peer-to-peer networks, generally referred to as vehicle-to-vehicle communication (V2V). These networks may be established based on proximity of vehicles to each other and/or strength of signal. However, the network connections may be transient as vehicles change speed, direction of travel or the like. Without the ability to establish less transient network connections, the effectiveness of operations, such as edge computing between vehicles or sharing updates, which can consist of large files, may not be fully utilized since the connections may periodically change.

Accordingly, there is a need for mesh networks that are more efficient, reliable, or are otherwise improved.

SUMMARY

In one embodiment, a mesh network system includes an electronic control unit. The electronic control unit is configured to determine a first motion state of a first vehicle of a plurality of vehicles of a mesh network. The electronic control unit is further configured to determine a second motion state of a second vehicle of the plurality of vehicles. The electronic control unit is further configured to select a dynamic routing protocol or a static routing protocol as a desired routing protocol based on the first motion state and the second motion state.

In one embodiment, a mesh network system includes a computing device operatively in communication with a plurality of vehicles of a mesh network. The computing device is configured to determine a first motion state of a first vehicle of the plurality of vehicles. The computing device is further configured determine a second motion state of a second vehicle of the plurality of vehicles. The computing device is further configured to select a dynamic routing protocol or a static routing protocol as a desired routing protocol based on the first motion state and the second motion state.

In another embodiment, a method includes determining, by a computing device, a first motion state of a first vehicle of a plurality of vehicles of a mesh network. The method may further include determining a second motion state of a second vehicle of the plurality of vehicles. The method may further include selecting a dynamic routing protocol or a static routing protocol as a desired routing protocol based on the first motion state and the second motion state.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for selecting a network routing protocol for communication between vehicular nodes of a mesh network. The mesh networks may facilitate information sharing, edge computing, access to wide area networks, and the like among the vehicles of the mesh network. Embodiments described herein are directed to systems and methods that may select a routing protocol for a mesh network based on motion states of vehicles, or the like. In an example, when a vehicle has a motion state that is stationary, below a threshold speed (e.g., such as in high traffic), or indicates that the vehicle is tracking or being tracked by one or more other vehicles, a mesh network system may select a static routing protocol. Conversely, when a vehicle has a motion state that is non-stationary, above a threshold speed, or indicates that the vehicle is not tracking or being tracked by one or more other vehicles, a mesh network system may select a dynamic routing protocol.

Figure 1:
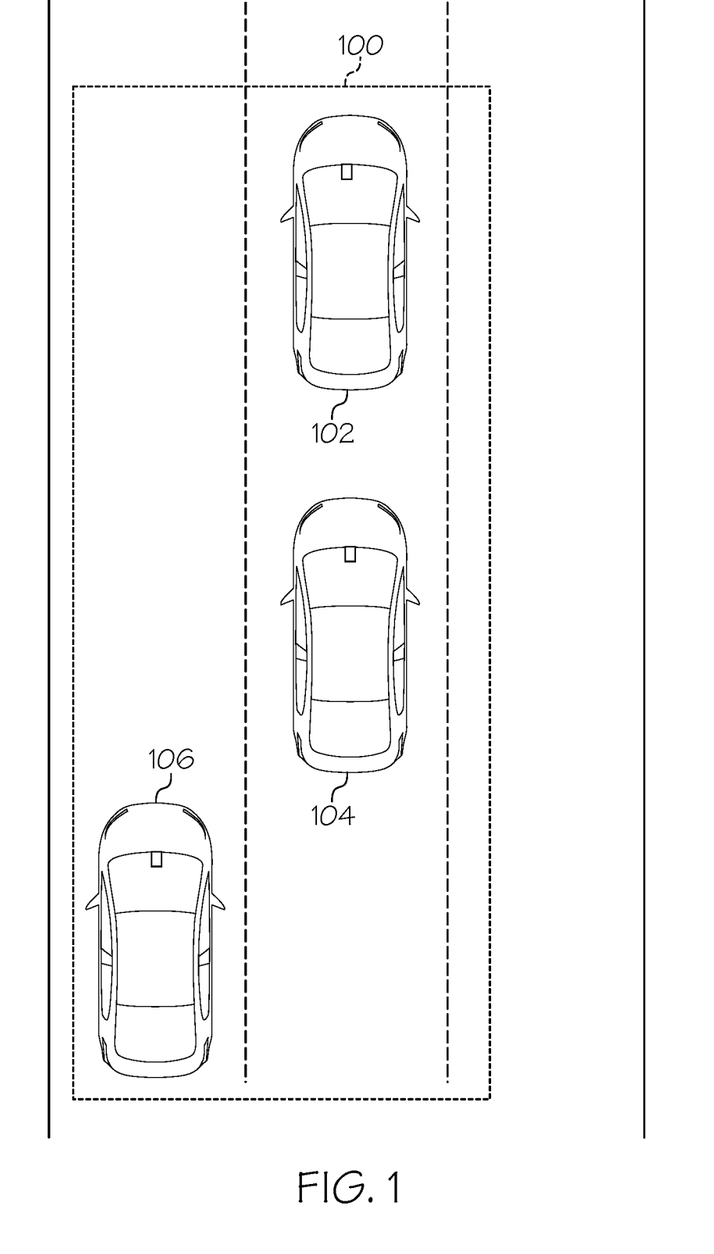
FIG. 1 depicts an illustrative embodiment of a mesh network system including vehicles and a mesh network according to one or more embodiments shown and described herein.

Turning now to the drawings wherein like numbers refer to like structures, and particularly to FIG. 1, an illustrative embodiment of a mesh network system 100 including nodes that comprise vehicles, such as a first vehicle 102, a second vehicle 104, and a third vehicle 106 traveling in the same direction along a roadway. In embodiments, two or more vehicles that are determined to be traveling with similar speeds, headings, proximities, destinations, or the like may be identified and grouped together via their communications units in a mesh network system 100. A communications unit may comprise one or more network interface devices, telematics units, or the like. For instance, a communications unit may include network interfaces for communicating via different access protocols, different duplexing schemes, in disparate frequency bands, etc. Such network interfaces may include Wi-Fi, $x^{th}$ generation cellular technology (e.g., 2G, 3G, 4G, 5G, etc.), WCDMA, LTE, LTE Advanced, ZigBee, Bluetooth, WiMAX, UMTS, code-division multiple access (CDMA), C-V2X, Global System for Mobile Communications (GSM), or the like.

It is noted that the first vehicle 102, the second vehicle 104, and the third vehicle 106 may be traveling in an appropriate configuration, such as a line formation, or other formation wherein the first vehicle 102, the second vehicle 104, and the third vehicle 106 are generally within a determined distance from each other. In some embodiments, the vehicles of a mesh network system 100 may be separated by other vehicles on the road or may be a predefined distance apart, but still traveling with similar speeds, headings, proximities, destinations, and/or the like. It is further noted that different numbers and types of vehicles may be utilized by or be comprised by the mesh network system 100.

The first vehicle 102, the second vehicle 104, and the third vehicle 106 may be communicatively linked to form the mesh network system 100. The mesh network system 100 may include a routing table that includes a vehicle identification (e.g., communications unit identification numbers, IP address, or other information related to the first vehicle 102, the second vehicle 104, and the third vehicle 106). A computing device (e.g., electronic control unit, etc.) of one or more of the first vehicle 102, the second vehicle 104, and the third vehicle 106, or a remote computing device may store the routing table in its memory (e.g., non-transitory computer-readable memory). Furthermore, the computing device may further determine member vehicles to be included in a mesh network system 100 based on their distance from each other, destination, speed, traveling path, or the like. These parameters may be dependent on speed and heading information or independent therefrom.

The mesh network system 100 may operate in an edge-computing environment where tasks such as navigation, autonomous environment detection and analysis, and the like may be performed by the electronic control units of the first vehicle 102, the second vehicle 104, and the third vehicle 106 that have available resources. For example, the first vehicle 102 may have an electronic control unit with advanced computing power over the second vehicle 104 and the third vehicle 106, so that the first vehicle 102 may be tasked with operations that require advanced computing resources. The second vehicle 104 may include sensor packages that are superior or positioned better with respect to their traveling relationships. Therefore, those sensor packages may be utilized over those of the first vehicle 102 and the third vehicle 106 in the mesh network system 100. As another example, the third vehicle 106 may have data or system updates that first vehicle 102 and the second vehicle 104 in the mesh network system 100 require. Therefore, instead of each of first vehicle 102, the second vehicle 104, and the third vehicle 106 establishing a cellular connection and performing tasks independently, which may be slow and costly, the first vehicle 102, the second vehicle 104, and the third vehicle in 106 the mesh network system 100, through a network interface such as WiFi, may transmit and receive data with each other. This may reduce download times and improve the distribution of a system update as vehicles may operate as additional sources of the update as opposed to a central server connected via a wide area network.

In embodiments described herein, a vehicle of the mesh network system 100 may be identified as a master node vehicle by a computing device of a vehicle or a remote computing device. This master node vehicle may receive the designation of master node vehicle based on capabilities of the vehicle, such as processing or computing resources, advanced telematics systems, or the like. This vehicle may also receive this designation based on information that it may have that other vehicles require. A master node vehicle may operate as an access point for other vehicles to connect through to access a wide area network (WAN), such as the internet. For example, some vehicles may only be equipped with near field communication interfaces such as Bluetooth or WiFi. These vehicles may be able to access WAN destinations by transmitting through a master node vehicle that is equipped with a communications unit having a long-range interface system (e.g., 4G LTE, 5G, etc.). The first vehicle 102, the second vehicle 104, the third vehicle 106, or other vehicles within the mesh network system 100 may each include a plurality of network interfaces configured to route communication to and from each of the vehicles. Network interfaces may be selected for communication based on a radio metric score.

Figure 2:
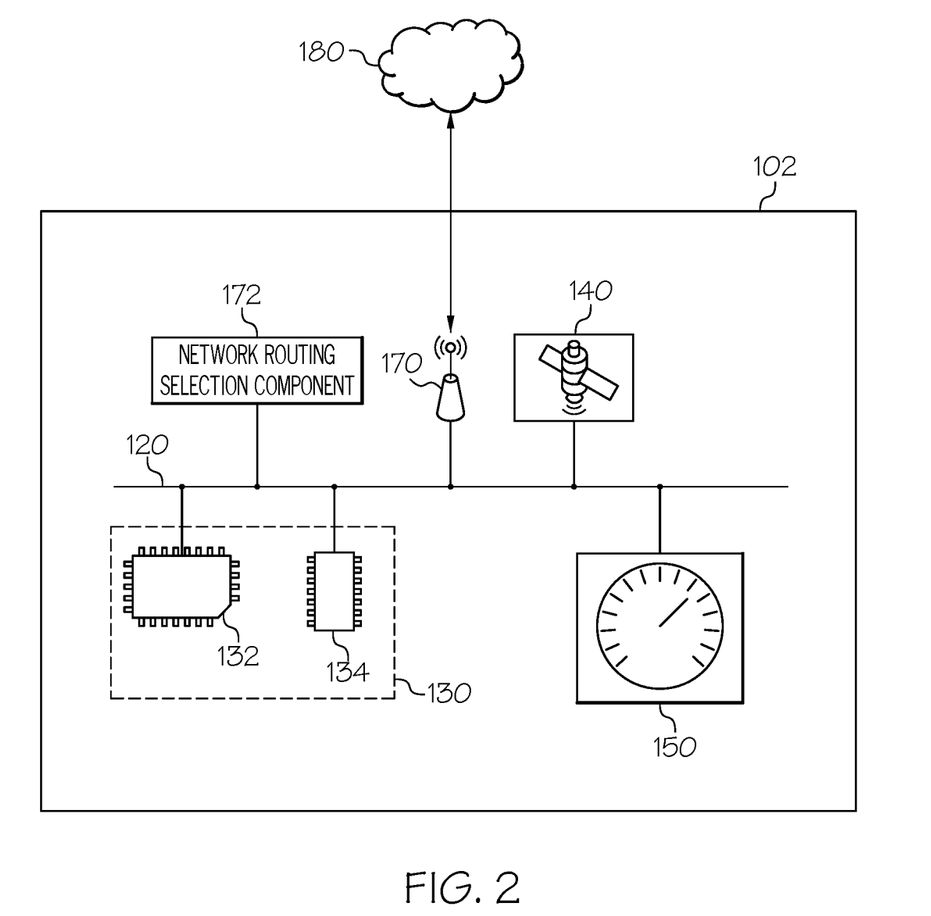
FIG. 2 schematically depicts components of a vehicle according to one or more embodiments shown and described herein.

Referring now to FIG. 2, an example schematic of a portion of the first vehicle 102 including sensor resources and a computing device is depicted. It is noted that other vehicles within the mesh network system 100 may be equipped with the same, similar, or different sets of sensor resources, telematics resources, or the like. In at least some embodiments, the first vehicle 102 may include an electronic control unit 130 comprising a processor 132 and a non-transitory computer readable memory 134, a navigation unit 140 (e.g., global positioning system (GPS), compass, etc.), a vehicle sensor(s) 150 (e.g., vehicle speed sensors, motion sensors, proximity sensors, etc.), and a communications unit 170. These and other components of the first vehicle 102 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the first vehicle 102 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. It is further noted that the processor 132 may comprise a single processor, multiple processors, or a system of processors.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It is noted that the non-transitory computer readable memory 134 may include one or more devices, memory modules, or the like.

Still referring to FIG. 2, a navigation unit 140 such as a GPS device, electronic compass, or the like may be coupled to the communication bus 120 and communicatively coupled to the electronic control unit 130 of the first vehicle 102. The navigation unit 140 is capable of generating location information and/or heading information indicative of a location of the first vehicle 102 by receiving one or more GPS signals from one or more GPS satellites. The navigation unit 140 may be configured to generate heading information, for example, based on an electronic compass. The GPS signal communicated to the electronic control unit 130 via the communication bus 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The first vehicle 102 may also include a vehicle sensor(s) 150 coupled to the communication bus 120 and communicatively coupled to the electronic control unit 130. The vehicle sensor(s) 150 may be any sensor or system of sensors for generating a signal indicative of vehicle speed, movement, proximity to other vehicles, etc. For example, without limitation, a vehicle sensor(s) 150 may be a tachometer that is capable of generating a signal indicative of a rotation speed of a shaft of the first vehicle 102 engine or a drive shaft. Signals generated by the vehicle sensor(s) 150 may be communicated to the electronic control unit 130 and converted to a vehicle speed value. The vehicle speed value is indicative of the speed of the first vehicle 102. In some embodiments, the vehicle sensor(s) 150 comprises an opto-isolator slotted disk sensor, a Hall Effect sensor, a Doppler radar, or the like. In some embodiments, a vehicle sensor(s) 150 may comprise data from a GPS for determining the speed of the first vehicle 102. The vehicle sensor(s) 150 may be provided so that the electronic control unit 130 may determine when the first vehicle 102 accelerates, maintains a constant speed, slows down or comes to a stop. For example, a vehicle sensor(s) 150 may provide signals to the electronic control unit 130 indicative of a vehicle 102 slowing down due to a change in traffic conditions or prior to the vehicle performing a turning maneuver. It is further noted that the vehicle sensor(s) 150 may determine a state of a vehicle, such as a motion state of a vehicle (e.g., whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, or the like.

The electronic control unit 130 may determine travel parameters such as a speed, direction of travel or heading, position, future or projected position, final destination, proximity or distance between vehicles (e.g., 1 mile, ¾ mile, ½ mile, ¼ mile, 5000 ft., 4000 ft., 3000 ft., 2000 ft., 1500 ft., 1000 ft., 500 ft., or 250 ft.), or the like based on one or more signals received from vehicle sensor(s) 150 and/or navigation unit 140. In some embodiments, the electronic control unit 130 selects vehicles to be included in the mesh network based on the travel parameters derived or received from the one or more signals from the vehicle sensor(s) 150 and/or navigation unit 140. For instance, the electronic control unit 103 (e.g., via the network routing selection component 172) and/or the computing device 192 (See FIG. 3) (via an electronic control unit or abstraction layer) identifies vehicles for and/or generates a mesh network including one or more vehicles based on: (i) a comparison of the speed of the vehicles and (ii) a comparison of the heading of the vehicles. As one example, the computing device 192 and/or the electronic control unit 130 identify one or more vehicles of the plurality of vehicles that are traveling at a speed that is less than or equal to a predetermined speed threshold of each other and have a heading that is less than or equal to a predetermined heading threshold of each other. The predetermined speed threshold may be about +/−10 miles per hour, about +/−9 miles per hour, about +/−8 miles per hour, about +/−7 miles per hour, about +/−6 miles per hour, about +/−5 miles per hour, about +/−4 miles per hour, about +/−3 miles per hour, about +/−2 miles per hour, about +/−1 miles per hour, or about +/−0.5 miles per hour. The predetermined heading threshold may be +/−10 degrees, +/−9 degrees, +/−8 degrees, +/−7 degrees, +/−6 degrees, +/−5 degrees, +/−4 degrees, +/−3 degrees, +/−2 degrees, +/−1 degrees, +/−0.5 degrees, or +/−0.25 degrees.

According to embodiments, the electronic control unit 130, vehicle sensor(s) 150, and/or navigation unit 140 may determine a motion state of a vehicle based on information received from the vehicle sensor(s) 150, and/or navigation unit 140. In examples, a motion state may comprise a stationary motion state, a non-stationary motion state, a speed motion state, a range of speeds motion state, a speed based on a threshold motion state, driving patterns (e.g., stop-and-go, highway driving, etc.), proximity to other vehicles, or the like. It is noted that a motion state, such as a stationary motion state or non-stationary motion state, may include travel or vehicle information, such as whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, a current position, a target or anticipated future position or destination, vehicle speeds, vehicle headings, vehicle proximities with each other, or the like. As described herein, motion states may be determined by one or more vehicle sensors, positioning data, information received from sever computing devices regarding traffic (e.g., map or traffic services), or the like.

In at least some examples, the electronic control unit 130 may identify two or more vehicles that have similar common motion states and are within a determined range of each other. Common motion states may include all vehicles in a stationary motion state, a non-stationary motion state, a non-stationary motion state with similar traveling parameters (e.g., traveling at a similar current position, a target or anticipated future position or destination, vehicle speeds, vehicle headings, vehicle proximities with each other, or the like).

The non-transitory computer readable memory 134 may include or be in communication with a network routing selection component 172. The network routing selection component 172 may include computer readable instructions (e.g., network routing selection component logic) that, when executed by the processor 132, cause the processor 132 to provide functions of the network routing selection component 172 described herein. It is further noted that the network routing selection component 172 may be disposed within or comprised by one or more devices (e.g., one or more electronic control units), remote devices (e.g., severs, remote computing devices), or the like. While embodiments may refer to a vehicle as comprising the network routing selection component 172, it is noted that severs, remote computing devices, or the like may comprise the network routing selection component 172. The network routing selection component 172 may be configured select a routing protocol for establishing the mesh network system 100, modifying the mesh network system 100, or otherwise for routing communications within the mesh network system 100.

In embodiments, the network routing selection component 172 may select a desired routing protocol from a plurality of available routing protocols for routing communications within the mesh network system 100. According to at least some embodiments, the plurality of routing protocols may include a dynamic routing protocol and a static routing protocol, as described in further detail in FIGS. 4 and 5. The network routing selection component 172 may select the desired routing protocol based at least one motion state of one or more vehicles. For instance, if a first motion state of the first vehicle is in a non-stationary motion state, the network routing selection component 172 may select the dynamic routing protocol. In another example, if the first motion state of the first vehicle 102 is in a stationary motion state or the first motion state of the first vehicle 102 is in a common motion state as one or more of a second motion state of the second vehicle 104 or a third motion state of the third vehicle 106, the network routing selection component 172 may select the static routing protocol.

As another example, when a plurality of vehicles within a mesh network are stationary or traveling in a common motion state, the network routing selection component 172 may select a static routing protocol as the desired routing protocol. If one or more of the vehicles surpasses becomes not stationary or not within the common motion state, the network routing selection component 172 may switch to a dynamic routing protocol for the one or more vehicles, while maintaining any vehicles of the plurality of vehicles in the static routing protocol. In some embodiments, the network routing selection component 172 may create two mesh networks that no longer communicate, or may create a hybrid network. In other embodiments, the network routing selection component 172 may apply a switch timer. If a one or more of the vehicles becomes not stationary or not within the common motion state, the network routing selection component 172 begins the switch timer. If the one or more of the vehicles that have become not stationary or not within the common motion do not become stationary or do not revert back into the common motion state within a given time period, the network routing selection component 172 may apply a dynamic routing protocol for the one or more of the vehicles. However, if the one or more of the vehicles do revert back to the common motion state or the stationary state prior to expiration of the switch timer, the network routing selection component 172 may determine to remain in the static routing protocol. In some embodiments, the network routing selection component 172 may update a routing table for the some or all of the vehicles. For instance, the network routing selection component 172 may update routing paths for communications to or from the one or more of the vehicles which had altered their motion state.

It is noted that the network routing selection component 172 may select network interfaces (e.g., such as LTE, $x^{th}$ generation cellular, DSRC, V2X, C-V2X or the like, etc.) for communications between vehicles. As described herein, the network routing selection component 172 may select network interfaces based on vehicle motion states, radio metrics, or the like.

Figure 4:
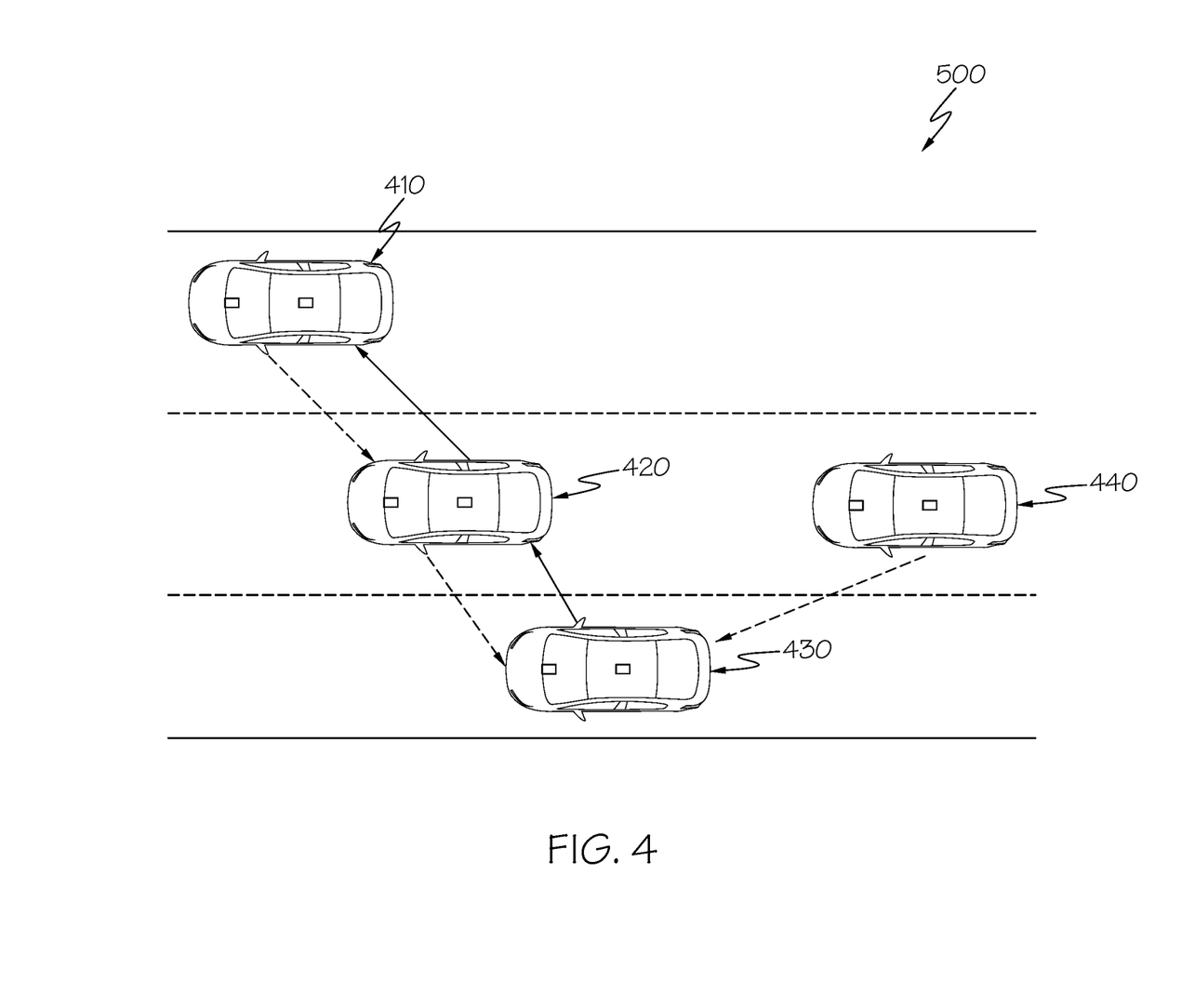
FIG. 4, depicts an illustrative embodiment of a mesh network system applying a dynamic routing protocol according to one or more embodiments shown and described herein.

Turning now to FIG. 4, there is a mesh network system 400 applying a dynamic routing protocol. The dynamic routing protocol may be referred to as on-demand routing (RM-AODV) protocol. The mesh network system 400 includes vehicles 410, 420, 430, and 440. In the dynamic routing protocol an initiating vehicle, such as vehicle 430, send data through a neighborhood of vehicle nodes, such as vehicles 420 and 440, until a destination vehicle, such as vehicle 410, is reached and then a reply is sent back to the initiating vehicle from the destination to determine the best path. Each vehicles 410, 420, 430, and 440 may be updated with forwarding and returning paths as requests are sent. Subsequently, larger data communications may occur between the source and destination nodes by using the best path at the time. However, dynamic routing protocols requires time to start communication. Thus, time is initially needed to determine the best path between the nodes for further communication. Accordingly, the dynamic routing protocol may be preferred for moving nodes (e.g., vehicles in a non-stationary motion state) as the relative position of the vehicles may change frequently.

Figure 5:
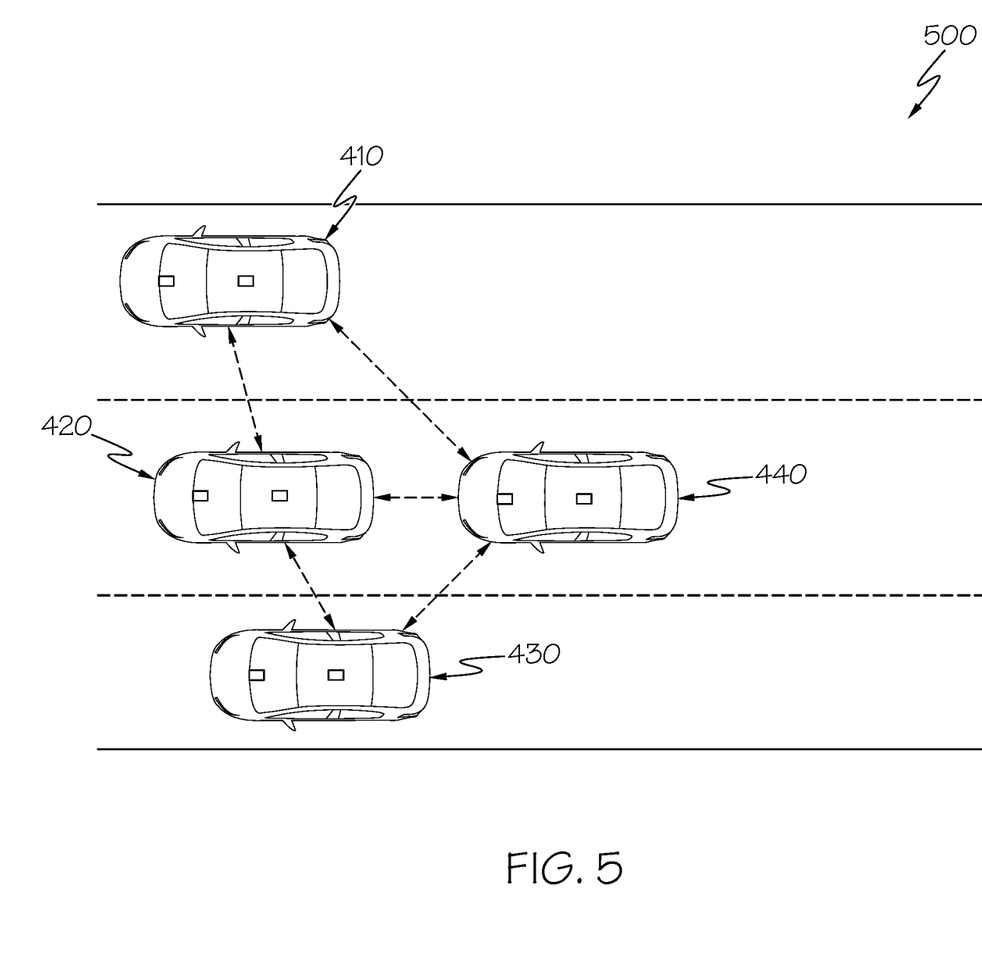
FIG. 5, depicts an illustrative embodiment of a mesh network system applying a static routing protocol according to one or more embodiments shown and described herein.

Turning now to FIG. 5 with reference to FIG. 2, there is a mesh network system 500 applying a static routing protocol. The static routing protocol, may include a routing table for the mesh network system 500 that is established when a node or vehicle is added or removed from a mesh network. The network routing selection component 172 may establish a routing table for each of vehicles 410, 420, 430, and 440 prior to communications such that communications between vehicles may occur without the delay required by dynamic routing protocols when a vehicle desires to communicate with another vehicle. In an example, if vehicle 430 requests data or a service from vehicle 410, the routing table may identify a path for vehicle 430 to communicate through the neighboring vehicles, such as vehicle 420 and 440. The vehicle 430 may be the source or requesting vehicle in this example, where the vehicle 430 communicates through the established route of nodes based on the routing table. This may be preferred when vehicles are stationary or when relative distance/positioning of vehicles are not changing. When a vehicle moves a relative position, the network routing selection component 172 may need to determine a new routing table or updated routing table. Conversely, when the vehicles are in a stationary motion state or in common motion states (e.g., moving in a relatively consistent manner with each other, such as in a traffic jam, when tracking each other on a freeway for a long period of time, etc.), the static routing protocol may be preferred.

According to an embodiment, network routing selection component 172 may determine communication paths (e.g., node orders, etc.) and network interfaces for communications between nodes. In an example, a node such as the vehicle 430, may send a radio metric exchange with each connected to the sending node. The radio metric, such as airtime, quantifies the quality of a network interface connection. The vehicle 430 may then send a request packet to each node within the mesh network system 400 via communications unit 170 (e.g., FIG. 2). Each relay node or relay electronic control unit (e.g., vehicle 410, 420, 440, etc.) may add, via their own network routing selection component 172, the value of the radio metric for the upcoming wireless link to the existing value of the radio metric in the request packet such that an accumulated radio metric value may be determined. In examples, each relay node may select a network interface of available network interfaces of the communications unit 170 having a lowest radio metric value, such as lowest airtime. The relay node may then transmit, via the communications unit 170, the request packet to the next relay node. This may iterate until a destination node receives the request packet. The destination node may then determine, via its own network routing selection component 172, a route and network interface type for communications. The destination node may then transmit a response packet that may notify each relay node of the selected route and selected network interface. As identified herein, the network routing selection component 172 may thus select a network interface between nodes with the lowest radio metric value for communications between nodes, without biasing towards any one network interface.

In some embodiments, the network routing selection component 172 may be configured to selectively utilize environmental factors for selection of a network interface. It is noted that utilization of environmental factors may be determined based on a user setting (e.g., user selection of whether to utilize environmental factors), may be configured to be utilized, or may be configured not to be utilized. For instance, as the mesh network system 100 involves moving nodes (e.g., vehicles 410, 420, 430, 440) that change in environmental factors, such as distance, location, and signal stability/strength between each other, may alter the radio metric for each type of network interface device (e.g., Wi-Fi, LTE, 5G, C-V2X) between each node.

In at least some embodiments, the network routing selection component 172 may iterate calculating of radio metric scores and selection of a desired network interface in response to a triggering event. For instance, a triggering event may include change of routing protocol, passage of time (e.g., intervals, periodically, etc.), change in vehicle motion state (e.g., starting, stopping, change in speed, etc.), removal or addition of a node, change to an environmental factor, or the like. It is further noted that the network routing selection component 172 may alter interval length based on vehicle motion, environmental factors, removal or addition of a node, or the like. For example, if a vehicle sensor(s) 150 (as described in more detail herein) determines that a vehicle is in a station state then begins to move at a determined speed or acceleration, the network routing selection component 172 may iterate calculation of radio metric scores and selection of a network interface. It is noted that the iterations may apply different weights for network interfaces.

In an example, the network routing selection component 172 may iterate calculation of radio metric scores and selection of a network interface at expiration of a time interval. For instance, the network routing selection component 172 may calculate radio metric scores and select a network interface every t units of time (e.g., 30 seconds, five minutes, etc.). In some embodiments, different intervals may be selected based on a motion state of a vehicle. For instance, the network routing selection component 172 may utilize a stationary time interval which may be an extended time interval (e.g., such as 5 minutes, 30 minutes, 1 hour, etc.) when compared to a time interval when a vehicle (e.g., vehicle 410, 420, 430, 440, etc.) is moving and/or moving at a speed meeting or exceeding a threshold speed. In another example, if the vehicle 410 is moving and/or moving at a speed meeting or exceeding a threshold speed, then the network routing selection component 172 may apply a non-stationary time interval that is a relatively shorter interval (e.g., 10 seconds, 20 seconds, 1 minute, etc.). In another example, if the vehicle 410 is moving at a relatively constant configuration with vehicles 420, 430, and 440 (e.g., remaining within a determined distance from one and other, moving at similar speeds, etc.), then the network routing selection component 172 may utilize a time interval that is greater than when vehicles are moving rapidly and/or in a non-constant configuration. It is noted that the network routing selection component 172 may select time intervals and/or calculate time intervals based on environmental factors, motion states, interference, or the like. Moreover, network routing selection component 172 may apply a weighted algorithm to determine time intervals. It is noted that other intervals and threshold may be utilized. Moreover, the network routing selection component 172 may adjust intervals based on the proximity or distance between the vehicles within the mesh network system 100 changes, in response to a transmission exceeding a threshold amount of time (e.g., timing out), or the like.

Referring again to FIG. 2, the network routing selection component 172 may select a time interval for calculating radio metric scores for each of a plurality of network interfaces for the vehicles, wherein the time interval is based at least in part on a motion state of a vehicle. The network routing selection component 172 may iterate, at least at the time interval, the following calculating the radio metric scores for each of the plurality network interfaces for a first vehicle of the two or more vehicles, selecting a desired network interface from the one or more network interfaces based on the radio metric scores, instructing the communications unit 170 to transmit a request packet from a source vehicle to a relay vehicle and/or destination vehicle, and receiving, via the communications unit 170, a final route and network interface type for communications. It is further noted that electronic control units (e.g., electronic control unit 130) may receive the request packets and iterate calculating radio metric scores, and sending the request packet to other relay nodes or a destination node.

In an example, a radio metric score C may be a function of a weighting factor "O", a bit size for a frame "$B_t$," a data rate "r" (e.g., Mbit/sec), and a frame error rate "ef". The weighting factor O may comprise an overhead of a network interface that may be weighted according to a motion sate. As such, weighting factor O may be dynamically calculated or determined based on a motion state. In another aspect, the bit size for a frame $B_t$ may be a static value (e.g., the same for each network interface), such as 8192. Data rate r and a frame error rate ef may be dynamic (e.g., variable depending on the wireless network interface, chipset/firmware or other components of a communications units 170, environmental factors, or the like). That is, some network interface devices work better than others do depending on the node's location, distance to another node, environmental factors (e.g., weather), interference from other wireless signals, an antenna type (e.g., directional antenna, omni antenna, etc.), vehicle motion, or the like. As an example, LTE and/or DSRC will generally provide more reliable communications during movement than WiFi due to robustness to Doppler Effect, etc. For instance, the following Equation 1 may be utilized to determine weighted radio metric scores for network interfaces:

$$C = \frac{\left(O + \frac{B_t}{r}\right)}{(1 - ef)} \quad \text{(Equation 1)}$$

The network routing selection component 172 may calculate radio metric scores for each available network interface according to Equation 1 and may select a network interface having a desired radio metric score (e.g., best, optimal, lowest, etc.) for communications between the first vehicle 102 and other vehicles within the mesh network system 100. The network routing selection component 172 may select weighting factors O for each radio network based on a motion state, as described here and elsewhere in this disclosure. In an example, if the first vehicle 102 is determined to have a motion state that is stopped or not moving, the weighting factor O for a first network interface or set of network interfaces (e.g., Wi-Fi radio metric score for a Wi-Fi network interface), may be set to a small value with respect to values of a second network interface or a second set of network interfaces (e.g., DSRC radio metric score for a DSRC network interface, cellular radio metric score for a cellular network interface, etc.). Selecting a low weighting factor O will bias the radio metric value toward selecting the first network interface or set of network interfaces for routing. In another aspect, the network routing selection component 172 may select a higher weighting factor O for the second network interface or a second set of network interfaces, which may also bias selection to the first network interface or set of network interfaces for routing.

By way of example, when in a stationary motion state, the weighting factor O for a first network interface (e.g., Wi-Fi) may be about between 1,000 and 700, or the like. In one embodiment, the weighting factor O may be 800. When in a moving, non-stationary motion state, or traveling at a speed above at or above a threshold, the weighting factor O may be between 1,000 and 3,000, such as about 2,000. The weighting factor O for other networks, such as DSRC, LTE, or the like may be between 1,000 and 700, such as about 800 when in stationary motion state, a non-stationary motion state, or other motion state. It is noted that the weighting factor O may comprise other values for network interfaces, may be weighted based on other motion states, or the like.

In embodiments, network routing selection component 172 may utilize artificial intelligence, statistical models, or other processes and/or algorithms to determine motion states, routing paths, time intervals, weights for motion states, adjust motion state classifications (e.g., determine patterns, adjust speed thresholds, etc.). For instance, motion states may be mapped to a radio metric vector and to a confidence that the motion state and the radio metric vector belongs to a class. An input attribute vector, x=(x1, x2, x3, x4, xn) may be mapped to f(x)=confidence(class). Such classification can employ a probabilistic and/or statistical based analysis (e.g., factoring into the analysis environmental factors, motion states of the first vehicle 102 or other vehicles, or the like) to infer an action or network interface to be selected. In various embodiments, systems and methods may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority for selection of network interfaces.

The communications unit 170 may include a vehicle-to-vehicle communication device for communicating with other vehicles (e.g., the second vehicle 104, the third vehicle 106, etc.) according to a target network routing protocol and selected network interface. The communications unit 170 may be coupled to the communication bus 120 and communicatively coupled to the electronic control unit 130. The communications unit 170 may be any device capable of transmitting and/or receiving data with a network 180 or directly with another vehicle (e.g., the second vehicle 104, the third vehicle) equipped with a communications unit 170. Accordingly, communications unit 170 can include a communication transceiver for sending and/or receiving any wired or wireless communication according to a network interface or protocol. For example, the communications unit 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, a communications unit 170 may include hardware configured to operate in accordance with the Bluetooth wireless communication protocol. In another embodiment, a communications unit 170 may include a Bluetooth send/receive module for sending and receiving Bluetooth communications to/from a network 180 and/or another vehicle.

Figure 3:
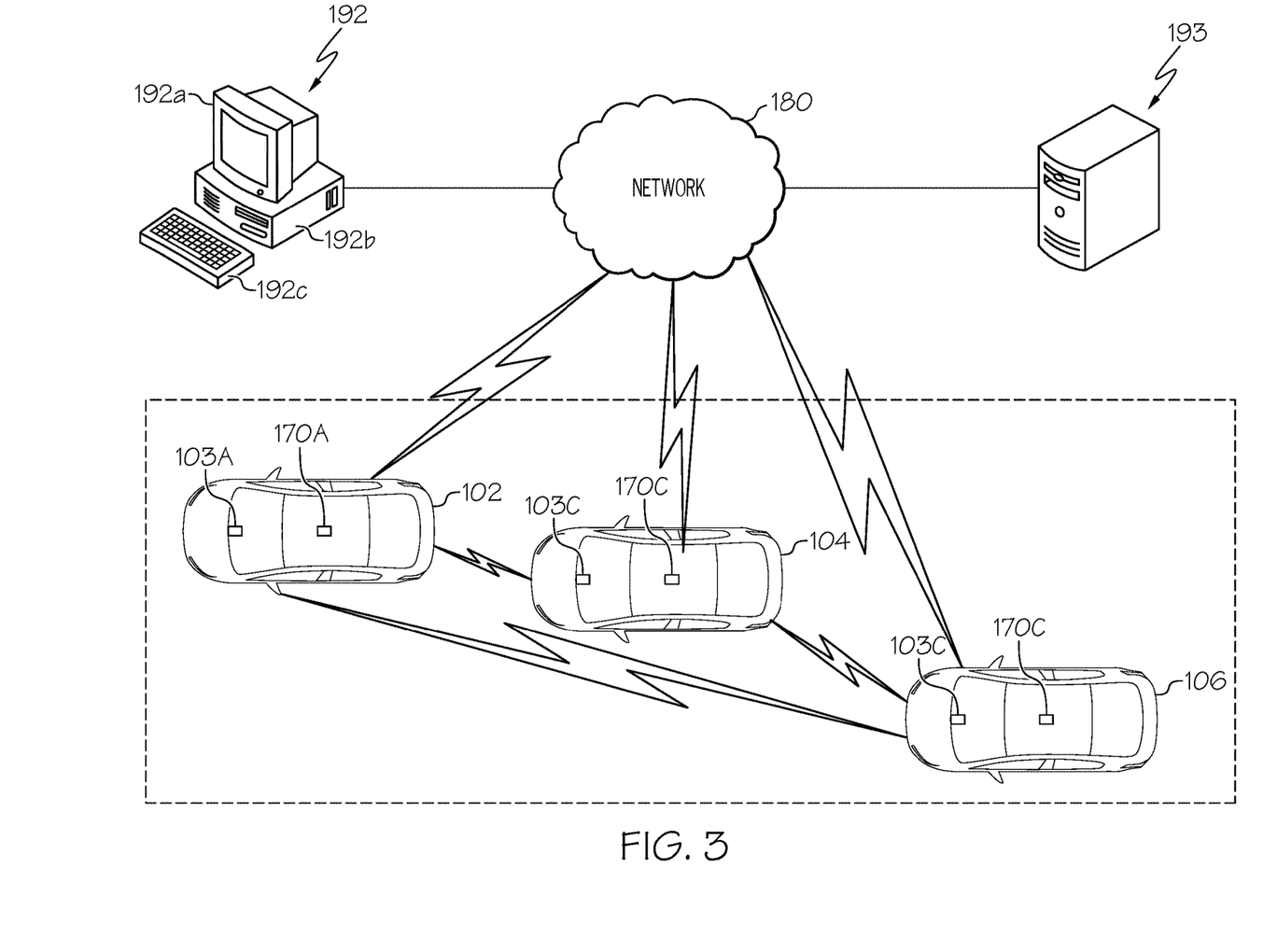
FIG. 3 depicts an illustrative embodiment of a mesh network system for selecting a desired network interface for a mesh network system according to one or more embodiments shown and described herein.

Referring now to FIG. 3 with reference to FIGS. 1 and 2, an illustrative embodiment of a system 300 for communicating with vehicles within the mesh network system 100. In some embodiments, communication between the first vehicle 102, the second vehicle 104, and the third vehicle 106 may be direct between each other. That is, the first vehicle 102 may communicate directly with the second vehicle 104 and/or the third vehicle 106, the second vehicle 104 may communicate directly with the first vehicle 102 and/or the third vehicle 106, and the third vehicle 106 may communicate directly with the first vehicle 102 and/or the second vehicle 104. In some embodiments, the first vehicle 102, the second vehicle 104 and/or the third vehicle 106 may communicate with each other through a network 180. In yet some embodiments, the first vehicle 102, the second vehicle 104 and/or the third vehicle 106 may communicate with one or more computing devices 192 and/or servers 193.

The network 180 may include one or more computer networks (e.g., a personal area network, a local area network, or a wide area network), cellular networks, satellite networks and/or a global positioning system and combinations thereof. Accordingly, the first vehicle 102, second vehicle 104 and third vehicle 106 and the computing device 192 and/or server 193 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, C-V2X, and GSM.

In particular, FIG. 3 depicts a first vehicle 102 having an electronic control unit 130A and a communications unit 170A, a second vehicle 104 having an electronic control unit 130B and a communications unit 170B, and a third vehicle having an electronic control unit 130C and a communications unit 170C. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include a processor, input/output hardware, network interface hardware, a data storage, and a memory component. The server 193 may have a similar configuration as the computing device 192, but configured to operate more strictly as a data storage and application support device.

The processor may include any processing component(s) configured to receive and execute instructions (such as from the data storage component and/or memory component). The instructions may be in the form of a machine-readable instruction set stored in the data storage component and/or the memory component. The input/output hardware may include a monitor, keyboard, mouse, printer, camera, microphone, speaker, and/or other device for receiving, sending, and/or presenting data. The network interface hardware may include any wired or wireless networking hardware, such as a modem, LAN port, Wi-Fi card, WiMax card, mobile communications hardware, and/or other hardware for communicating with other networks and/or devices.

It should be understood that the data storage component may reside local to and/or remote from the computing device 192 and may be configured to store one or more pieces of data such as a routing table, updates for vehicle systems, or the like for access by the computing device 192 and/or other components. It is understood that the server 193 may also be configured to store one or more pieces of data such as a routing table, updates for vehicle systems, or the like for access by the computing device 192 and/or vehicles via the network 180.

A computing device 192 and/or an electronic control unit 130 may then use the speed, heading, position, and/or destination information, also referred to herein as traveling parameters, to determine relationships between the vehicles and identify vehicles that may form a mesh network based on their traveling parameters, motion states, and the like. Once a mesh network is established by the computing device 192 or the electronic control unit 130, a master node vehicle (e.g., first vehicle 102) may be identified and utilized as an access point for other vehicles (e.g., second vehicle 104) in the mesh network system 100 to communicate with the computing device 192, the server 193, or other devices via the WAN (e.g., the network 180).

As described herein, the mesh network system 100 may include the first vehicle 102, the second vehicle 104, the third vehicle 106, and/or other vehicles, where each vehicle acts as a node. Moreover, each communications unit 170A, 170B, 170C of the respective vehicles may include network interfaces for a plurality of different networks, protocols, or the like. For instance, each communications unit 170A, 170B, 170C may include one or more antennas (e.g., many in/many out (MIMO) antennas, etc.) that may allow for communication via Wi-Fi networks, IrDA, Bluetooth, Wireless USB, Z-Wave, ZigBee, near field communication (NFC), LTE, WiMAX, UMTS, CDMA, C-V2X, GSM interfaces may include Wi-Fi, $x^{th}$ generation cellular technology (e.g., 2G, 3G, 4G, 5G, etc.), WCDMA, LTE Advanced, or the like. The electronic control units 130A, 130B, 130C (See FIG. 3) and/or the computing device 192 or the servers 193 may be configured to determine motion states of vehicles, select routing protocols, calculate radio metrics for communications between the vehicles or the communications unit 170A, 170B, 170C over the one or more network interfaces, or the like.

FIG. 3 further depicts a first vehicle 102 having an electronic control unit 130A and a communications unit 170A, a second vehicle 104 having an electronic control unit 130B and a communications unit 170B, and a third vehicle having an electronic control unit 130C and a communications unit 170C. In embodiments described herein, an electronic control unit may act as an source electronic control unit (e.g., initiating or source node) which transmits an initial request, a relay electronic control unit (e.g., relay node) which receives a request and transmits to another relay node or a destination node, or a destination electronic control unit (e.g., destination node) which is a target for a request. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include a processor, input/output hardware, network interface hardware, a data storage, and a memory.

Figure 6:
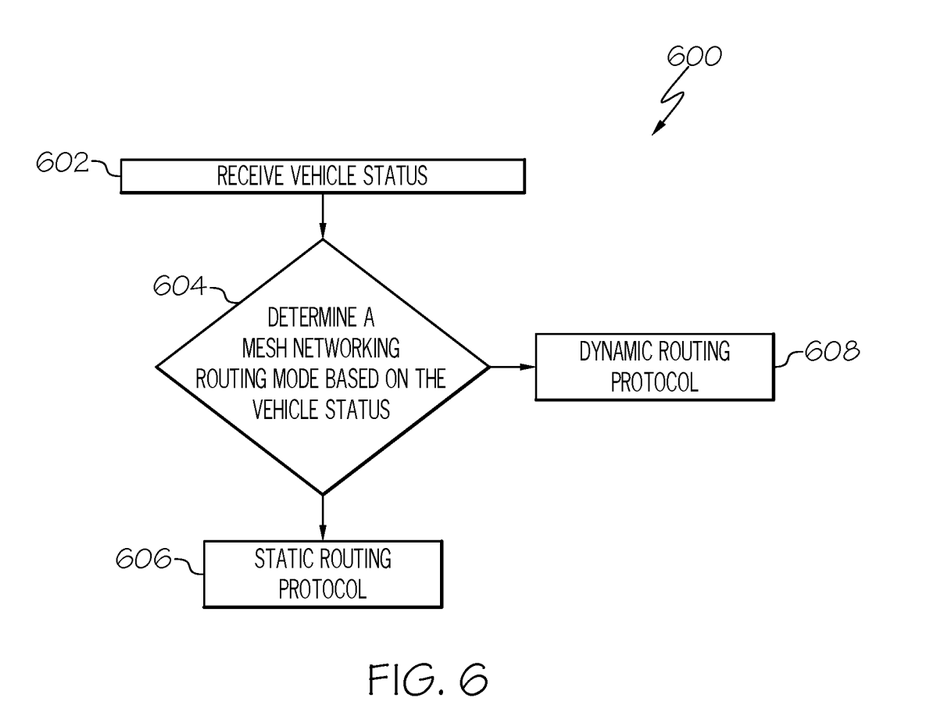
FIG. 6 depicts a flowchart of an example method for selecting a desired routing protocol for a mesh network system according to one or more embodiments shown and described herein.
Figure 7:
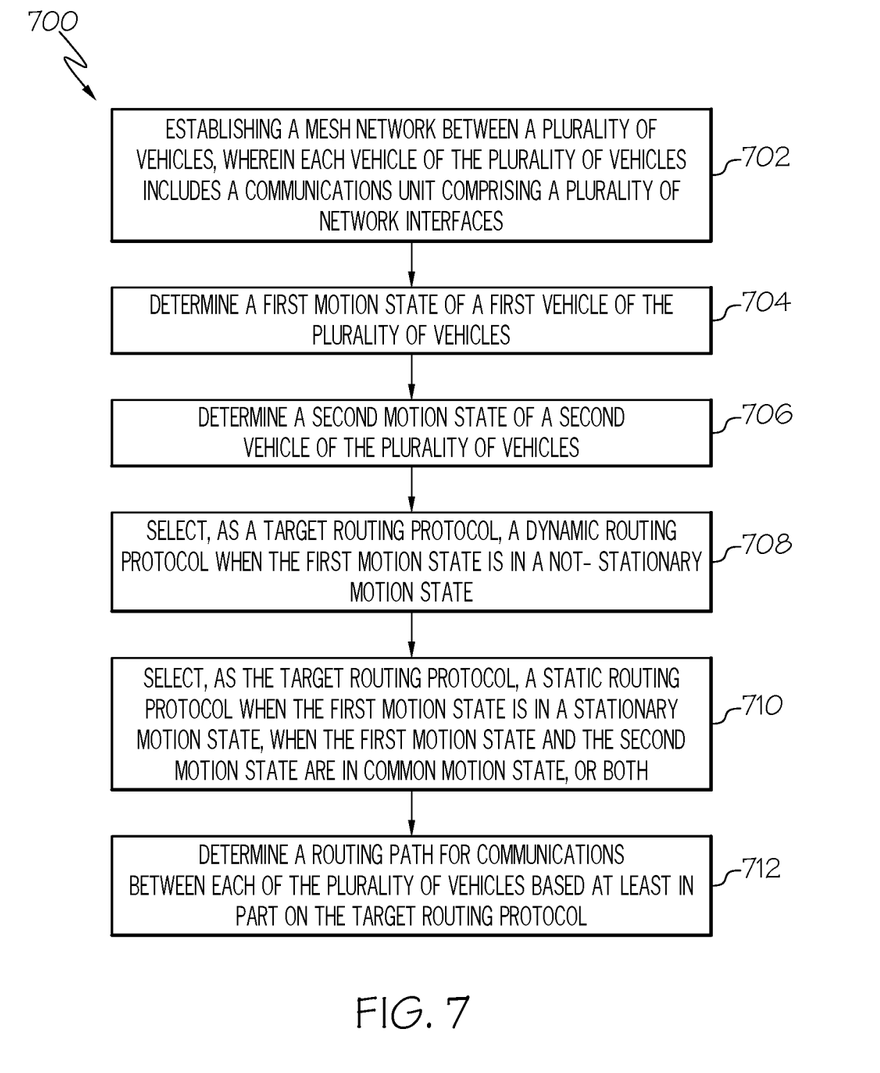
FIG. 7 depicts a flowchart of an example method for selecting a desired routing protocol for a mesh network system according to one or more embodiments shown and described herein.

In view of the subject matter described herein, methods that may be related to various embodiments may be better appreciated with reference to the flowcharts of FIGS. 6 and 7. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a mesh network system or components thereof, such as the computing device 192 and/or an electronic control unit 130 (e.g., FIGS. 2-3), or the like.

FIG. 6 depicts a flowchart 600 of an example method for selecting a routing protocol for a mesh network system. The flowchart 600 depicted in FIG. 6 is a representation of a machine-readable instruction set stored in the non-transitory computer readable memory 134 and executed by the processor 132 of an electronic control unit 130 or a processing unit 192*b* of a computing device 192. The process of the flowchart 600 in FIG. 6 may be executed at various times and intermittently repeated (e.g., every minute, five minutes, etc.) to confirm membership of vehicles to a mesh network.

At block 602, a mesh network system (e.g., via a computing device 192 and/or an electronic control unit 130), may receive a vehicle status, such as a motion state (e.g., stationary, non-stationary, movement pattern, proximity state, etc.). In an example, vehicle sensors (e.g., vehicle sensor(s) 150) and/or navigation unit (e.g., navigation unit 140) may provide signals indicative of a vehicle status, such as ignition on/off state, cruise control on/off state, traffic status, current position, tracking another vehicle status, or the like. In embodiments, a motion state may be determined based on one or more of ignition on/off state, cruise control on/off state, traffic status, current position, tracking another vehicle status, or the like.

At block 604, the mesh network system may determine a mesh networking routing mode based on the vehicle status. For instance, if the motion state indicates that the vehicle ignition is on, a speed is above a threshold speed (e.g., non-stationary, above 10 miles per hour, etc.), and not tracking other vehicles (e.g., does not include a common motion state), then the mesh network system may determine to select the dynamic routing protocol at block 608. Otherwise, if the motion state indicates that the vehicle is in a stationary motion state (e.g., such as with an ignition off, a speed at zero, etc.), a motion state indicative of slow movement (e.g., below a threshold speed), and/or the vehicle has a common motion state with other vehicles (e.g., position of moving vehicles is not changing), then the mesh network system may determine to select the static routing protocol at block 606.

FIG. 7 depicts a flowchart 700 of an example method for selecting a routing protocol for a mesh network system. The flowchart 700 depicted in FIG. 7 is a representation of a machine-readable instruction set stored in the non-transitory computer readable memory 134 and executed by the processor 132 of an electronic control unit 130 or a processing unit 192*b* of a computing device 192. The process of the flowchart 700 in FIG. 7 may be executed at various times and intermittently repeated (e.g., every minute, five minutes, etc.) to confirm membership of vehicles to a mesh network.

At block 702, the method may establish a mesh network. For instance, a mesh network system (e.g., via a computing device 192 and/or an electronic control unit 130), may establish a mesh network between two or more vehicles. Each vehicle of the two or more vehicles includes a communications unit comprising a plurality of network interfaces. The mesh network system may identify vehicles to be included in the mesh network based on vehicle travel characteristics, such as position information (e.g., a current position of vehicles, a target or anticipated future position or destination of vehicles, vehicle speeds, vehicle headings, vehicle proximity, or the like). In examples, the mesh network system may receive data from the two or more vehicles based on vehicle sensors. According to some embodiments, the mesh network system may receive travel characteristics from remote computing devices, GPS systems, or the like. In some embodiments, the mesh network identifies and/or generates a mesh network including one or more vehicles based on: (i) a comparison of the current positions of the vehicles and (ii) a comparison of the future positions of the vehicles. For instance, vehicles with similar current positions and similar future positions may be selected for a mesh network. Similar current positions and similar future positions may be vehicles within a predetermined range of each other and/or have a similar heading and speed, or the like.

At block 704, the method may determine a first motion state of a first vehicle. In embodiment, a mesh network system may determine a first motion state of a first vehicle. At block 706, determine a second motion state for a second vehicle. For instance, the mesh network system may determine the second motion state for the second vehicle. The first and second motion states may be determined or calculated based on vehicle travel characteristics, such as position information, or the like. In at least some embodiments, the mesh network system may determine the motion states based on a vehicle sensor signal received from a vehicle sensor (e.g., vehicle sensor(s) 150, FIG. 2-3). The vehicle sensor may be configured to generate a sensor signal that is indicative of a vehicle speed, a vehicle movement, a vehicle proximity to other vehicles, or a combination thereof. The current motion state may be selected from a plurality of predefined motion states, such as at least one of a stationary motion state, a non-stationary motion state, a range of speed based motion state, driving pattern motion state, or a proximity to other vehicles motion state. According to at least some embodiments, motion states may be identified for a set of vehicles having similar motion states. In another aspect, motion states may be determined based on artificial intelligence, statistical models, or other processes and/or algorithms to determine or adjust motion state classifications (e.g., determine patterns, adjust speed thresholds, etc.).

At block 708, the method may select a dynamic routing protocol or a static routing protocol as a desired routing protocol. In examples, the mesh network system may select, as a desired routing protocol, a dynamic routing protocol when the first motion state is in a not-stationary motion state and the first motion state and the second motion state are in a non-common motion state. In an example, the first and second motion states may be in a non-common motion state when the first vehicle and the second vehicle have dissimilar speeds, a history or pattern of irregular movement or proximity to one and other, or are otherwise not tracking similar movements or routes of travel.

Moreover, the mesh network system may select, as the desired routing protocol, a static routing protocol when the first motion state is in a stationary motion state, when the first motion state and the second motion state are in common motion state, or both. In an example, the first and second motion states may be in a common motion state when the first vehicle and the second vehicle have similar speeds, a history or pattern of similar movements, are in generally stable proximity to one another, or are otherwise tracking similar movements or routes of travel.

In embodiments, the mesh network system determine a routing path for communications between each of the plurality of vehicles based at least in part on the desired routing protocol. When applying a stating routing protocol, the routing path may be defined by a routing table. The routing table may indicate routing paths for communications from a source vehicle to a destination vehicle. In at least one example, the routing table may be distributed to each vehicle, may be stored in a remote computing device or server, or the like. When applying a dynamic routing protocol, the routing path may be determined such that data may be transmitted via different routes on the current conditions of the vehicles, such as current positions, motion states, etc.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Accordingly, described embodiments include a mesh network system including an electronic control unit and/or computing device. The electronic control unit is configured to determine a first motion state of a first vehicle of a plurality of vehicles of a mesh network. The electronic control unit is further configured to determine a second motion state of a second vehicle of the plurality of vehicles. The electronic control unit is further configured to select a dynamic routing protocol or a static routing protocol as a desired routing protocol based on the first motion state and the second motion state.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mesh network system, comprising:
an electronic control unit configured to:
determine a first motion state of a first vehicle of a plurality of vehicles of a mesh network;
determine a second motion state of a second vehicle of the plurality of vehicles; and
select a dynamic routing protocol or a static routing protocol as a desired routing protocol based on the first motion state and the second motion state.

2. The mesh network system of claim 1, wherein the electronic control unit is further configured to:
in response to the first motion state comprising a non-stationary motion state and the first motion state and the second motion state comprising non-common motion states, select the dynamic routing protocol as the desired routing protocol; and
in response to the first motion state comprising a stationary motion state, the first motion state and the second motion state comprising common motion states, or both, select the static routing protocol as the desired routing protocol.

3. The mesh network system of claim 2, wherein the electronic control unit is further configured to determine that the first motion state and the second motion state comprise the common motion states when the first motion state further indicates that the first vehicle is tracked by or is tracking the second vehicle.

4. The mesh network of claim 3, wherein the electronic control unit is further configured to determine that the first motion state further indicates that the first vehicle is tracked by or is tracking the second vehicle based on at least one of vehicle speeds, a history or pattern of movements, proximity of vehicles, routes of travel, or a combination thereof.

5. The mesh network system of claim 1, further comprising a vehicle sensor communicatively coupled to the electronic control unit, wherein the vehicle sensor is configured to identify the first motion state.

6. The mesh network system of claim 5, wherein the vehicle sensor comprises at least one of a speed sensor, a motion sensors, or a proximity sensor.

7. The mesh network system of claim 5, wherein the first motion state is selected from at least one of a stationary motion state or a non-stationary motion state.

8. The mesh network system of claim 1, wherein the in response to the first motion state or the second motion state being altered, the electronic control unit is further configured to determine whether to alter the desired routing protocol.

9. The mesh network system of claim 1, wherein the electronic control unit is further configured to determine a routing path for communications between each of the plurality of vehicles based at least in part on the desired routing protocol.

10. The mesh network system of claim 1, wherein the static routing protocol defines a routing table that identifies routes to each of the plurality of vehicles.

11. The mesh network system of claim 1, wherein the electronic control unit configured is further configured to select one or more radio network interfaces for communications between the plurality of vehicles.

12. The mesh network system of claim 11, wherein the electronic control unit configured is further configured to select the one or more radio network interfaces for communications between the plurality of vehicles based on at least one of the first motion state or the second motion state.

13. A mesh network system, comprising:
a computing device operatively in communication with a plurality of vehicles of a mesh network, wherein the computing device is configured to:
determine a first motion state of a first vehicle of the plurality of vehicles;
determine a second motion state of a second vehicle of the plurality of vehicles; and select a dynamic routing protocol or a static routing protocol as a desired routing protocol based on the first motion state and the second motion state.

14. The mesh network system of claim 13, wherein the computing device is further configured to:
   in response to the first motion state being determined as a non-stationary motion state and the first motion state and the second motion state comprising non-common motion states, select the dynamic routing protocol as the desired routing protocol; and
   in response to the first motion state being determined as a stationary motion state, the first motion state and the second motion state comprising common motion states, or both, select the static routing protocol as the desired routing protocol.

15. The mesh network system of claim 13, wherein the computing device determines that the first motion state and the second motion state are in the common motion states when the first vehicle and the second vehicle have similar speeds, a history or pattern of similar movements, are in generally stable proximity to one and other, or are tracking similar movements or routes of travel.

16. The mesh network system of claim 13, wherein the computing device is further configured to determine the first motion state based on input from at least one of a speed sensor, a motion sensors, a proximity sensor, a global positioning system, or a combination thereof.

17. A method comprising:
   determining by a computing device, a first motion state of a first vehicle of a plurality of vehicles of a mesh network;
   determining a second motion state of a second vehicle of the plurality of vehicles; and
   selecting a dynamic routing protocol or a static routing protocol as a desired routing protocol based on the first motion state and the second motion state.

18. The method of claim 17, further comprising:
   in response to the first motion state comprising a non-stationary motion state and the first motion state and second motion state comprising non-common motion states, selecting the dynamic routing protocol as the desired routing protocol; and
   in response to the first motion state comprising a stationary motion state, the first motion state and the second motion state comprising a common motion state, or both, selecting the static routing protocol as the desired routing protocol.

19. The method of claim 18, further comprising determining whether the first motion state and the second motion state are in the common motion state based on vehicle speeds, a history or pattern of vehicle movements, proximity of the first vehicle to the second vehicle, or the first vehicle tacking or being tracked by the second vehicle.

20. The method of claim 17, in response to the first motion state or the second motion state being altered, determining whether to alter the desired routing protocol.

* * * * *

UNITED STATES PATENT AND TRADEMARK OFFICE
CERTIFICATE OF CORRECTION

| | | |
|---|---|---|
| PATENT NO. | : 11,477,718 B1 | Page 1 of 1 |
| APPLICATION NO. | : 17/219014 | |
| DATED | : October 18, 2022 | |
| INVENTOR(S) | : Shingo Sugimoto and Osamu Kawakami | |

It is certified that error appears in the above-identified patent and that said Letters Patent is hereby corrected as shown below:

In the Specification

In Column 6, Line 33, delete "⅜ mile," and insert --3/4 mile,--, therefor Signed and Sealed this
Sixth Day of December, 2022

Katherine Kelly Vidal
*Director of the United States Patent and Trademark Office*